United States Patent
Ho et al.

(10) Patent No.: US 11,182,006 B1
(45) Date of Patent: Nov. 23, 2021

(54) ILLUMINATED TOUCH PANEL AND BACKLIGHT ASSEMBLY THEREOF

(71) Applicant: Chicony Power Technology Co., Ltd., New Taipei (TW)

(72) Inventors: Hsuan-Wei Ho, New Taipei (TW); Ting-Wei Chang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/097,939

(22) Filed: Nov. 13, 2020

(30) Foreign Application Priority Data

Aug. 24, 2020 (TW) .................................. 109128853

(51) Int. Cl.
*G06F 3/041* (2006.01)
*F21V 8/00* (2006.01)
*G06F 1/16* (2006.01)

(52) U.S. Cl.
CPC ......... *G06F 3/0412* (2013.01); *G02B 6/0068* (2013.01); *G02B 6/0088* (2013.01); *G06F 1/1609* (2013.01)

(58) Field of Classification Search
CPC .... G02B 6/0068; G02B 6/0088; G06F 3/0412
See application file for complete search history.

(56) References Cited

U.S. PATENT DOCUMENTS

| 8,931,943 B2 * | 1/2015 | Kunimochi .......... G02B 6/0031 |
| | | 362/609 |
| 2010/0163317 A1 * | 7/2010 | Tai ........................ G06F 3/0488 |
| | | 178/18.09 |
| 2012/0155110 A1 * | 6/2012 | Pijlman .................. G02B 6/008 |
| | | 362/602 |
| 2014/0085930 A1 | 3/2014 | Hua et al. |
| 2020/0201107 A1 | 6/2020 | Kazutada |

FOREIGN PATENT DOCUMENTS

| CN | 101680632 A | 3/2010 |
| CN | 102016390 A | 4/2011 |
| CN | 102192440 A | 9/2011 |
| CN | 104806923 A | 7/2015 |
| CN | 107526211 A | 12/2017 |

(Continued)

*Primary Examiner* — Matthew J. Peerce
(74) *Attorney, Agent, or Firm* — Innovation Capital Law Group, LLP; Vic Lin (57) ABSTRACT

An illuminated touch panel includes a backlight assembly and a cover plate. The backlight assembly includes a light guide plate, and an outer stop. The light guide plate includes a plurality of bar portions and a connecting portion. The plurality of bar portions are separated from each other and arranged side by side. Each of the bar portions includes a pattern dot region, a connecting end and a light entrance end. There is a narrow slot between any two adjacent bar portions. The long axis direction of each of the extending dot regions of the connecting portion is substantially parallel to the length direction of each of the narrow slots. The plurality of light blocking bars of the outer stop are arranged side by side and fitted with the plurality of narrow slots. The cover plate includes a plurality of window regions corresponding to the plurality of pattern dot regions.

17 Claims, 9 Drawing Sheets

(56) References Cited

FOREIGN PATENT DOCUMENTS

| | | |
|---|---|---|
| CN | 107831565 A | 3/2018 |
| TW | 200700797 A | 1/2007 |
| TW | 201025101 A | 7/2010 |
| TW | 201310282 A | 3/2013 |
| TW | I522698 B | 2/2016 |
| TW | I617958 B | 3/2018 |
| TW | I631496 B | 8/2018 |

* cited by examiner

ILLUMINATED TOUCH PANEL AND BACKLIGHT ASSEMBLY THEREOF

CROSS-REFERENCE TO RELATED APPLICATION

This non-provisional application claims priority under 35 U.S.C. § 119(a) to Patent Application No. 109128853 filed in Taiwan, R.O.C. on Aug. 24, 2020, the entire contents of which are hereby incorporated by reference.

BACKGROUND

Technical Field

The present invention relates to an illuminated touch panel and backlight assembly thereof, and in particular, to a regionally-illuminated touch panel and a backlight assembly thereof.

Related Art

Conventional electronic products, such as notebook computers, usually have physical keys and a touch panel. As portable electronic products are developed to be increasingly thinner, available spaces of the products are relatively reduced. Therefore, it is likely that a thin and light notebook computer displays virtual keys and visual images on a touch panel to save a space of physical keys and improve convenience for user operation. In other words, the virtual keys and the visual images are displayed by a backlight assembly of the touch panel for a user to operate.

SUMMARY

An illuminated touch panel known to the inventors includes a direct backlight assembly or an edge LED backlight assembly, and turns on or off all light-emitting elements of the assembly simultaneously. This assembly could not satisfy some specific applications. In the applications, virtual keys and visual images displayed by an illuminated touch panel may be, but not limited to, a computer function menu that can be adjusted and controlled in sections and a corresponding status. For example, the illuminated touch panel may display several indicators for the status of a fan or a speaker. For example, when one indicator is illuminated, it indicates that the current speed of the fan or the current volume of the speaker corresponds to scale one which may mean lower speed or lower volume. When seven indicators are illuminated, it indicates that the current speed or the current volume corresponds to scale seven which may mean higher speed or higher volume. In addition, a user may touch one or more of the indicators to adjust the speed of the fan or the volume of the speaker.

However, an inventor learns that even though each indicator may be independently controlled to be individually lit up, there are still problems of light interference happened in the adjacent region between two adjacent indicators. This results in misleading a user. In view of this, according to some embodiments, an illuminated touch panel has a backlight assembly which is adapted to independently light up different indicators.

According to some embodiments of the present invention, a backlight assembly is adapted to be electrically connected to a circuit board. The backlight assembly includes a light source module, a light guide plate, and an outer stop. The light source module includes a plurality of light-emitting components located on the circuit board. Each of the light-emitting components has a light exit surface. The light guide plate is located on the circuit board. The light guide plate includes a plurality of bar portions and a connecting portion. The plurality of bar portions are separated from each other and arranged side by side. Each of the bar portions includes a pattern dot region located on a bottom surface of the light guide plate, a connecting end and a light entrance end that is opposite to the connecting end. The connecting portion is connected to the plurality of connecting ends. The connecting portion includes a plurality of extending dot regions. There is a narrow slot between any two adjacent bar portions. The long axis direction of each of the extending dot regions is substantially parallel to the length direction of each of the narrow slots. The outer stop is located at an outer periphery of the light guide plate, and there are a plurality of gaps between the outer stop and the plurality of light entrance ends. The outer stop includes a plurality of light blocking bars. The plurality of light blocking bars are arranged side by side and fitted with the plurality of narrow slots. The plurality of light-emitting components are located in the plurality of gaps, and the plurality of light exit surfaces face the plurality of light entrance ends.

According to some embodiments of the present invention, a illuminated touch panel includes a circuit board, a backlight assembly, and a cover plate. The circuit board includes a touch circuit. The backlight assembly includes a light source module, a light guide plate, and an outer stop. The light source module includes a plurality of light-emitting components located on the circuit board. Each of the light-emitting components has a light exit surface. The light guide plate is located on the circuit board. The light guide plate includes a plurality of bar portions and a connecting portion. The plurality of bar portions are separated from each other and arranged side by side. Each of the bar portions includes a pattern dot region located on a bottom surface of the light guide plate, a connecting end and a light entrance end that is opposite to the connecting end. The connecting portion is connected to the plurality of connecting ends. The connecting portion includes a plurality of extending dot regions. There is a narrow slot between any two adjacent bar portions. The long axis direction of each of the extending dot regions is substantially parallel to the length direction of each of the narrow slots. The outer stop is located at an outer periphery of the light guide plate, and there are a plurality of gaps between the outer stop and the plurality of light entrance ends. The outer stop includes a plurality of light blocking bars. The plurality of light blocking bars are arranged side by side and fitted with the plurality of narrow slots. The plurality of light-emitting components are located in the plurality of gaps, and the plurality of light exit surfaces face the plurality of light entrance ends. The cover plate is located on a top surface of the light guide plate opposite to the bottom surface. The cover plate includes a plurality of window regions corresponding to the plurality of pattern dot regions.

According to some embodiments of the present invention, a light-absorbing layer is further included and is located on at least one of the top surface and the bottom surface of the light guide plate. An orthographic projection of the light-absorbing layer on the light guide plate overlaps the plurality of extending dot regions.

According to some embodiments of the present invention, the thickness of the outer stop is greater than the thickness of the light guide plate and the thickness of each of the light-emitting components.

According to some embodiments of the present invention, the area of the plurality of pattern dot regions is larger than the area of the plurality of window regions.

According to some embodiments of the present invention, an adhesive layer is further included and is located on at least one of the top surface and the bottom surface of the light guide plate. An orthographic projection of the adhesive layer on the light guide plate overlaps the plurality of extending dot regions.

According to some embodiments of the present invention, the circuit board has a first light-absorbing region thereon, and the first light-absorbing region is adjacent to the plurality of light exit surfaces.

According to some embodiments of the present invention, a reflective sheet is further included and is located between the circuit board and the light guide plate. The reflective sheet includes a plurality of avoidance openings, orthographic projections of the plurality of avoidance openings on the light guide plate overlap the plurality of gaps, and the plurality of light-emitting components are located in the plurality of avoidance openings and protrude from the reflective sheet. The reflective sheet has a second light-absorbing region thereon, and the second light-absorbing region is adjacent to the plurality of light exit surfaces.

According to some embodiments of the present invention, the circuit board has a first light-absorbing region thereon, the first light-absorbing region is adjacent to the plurality of light exit surfaces, and the plurality of avoidance openings of the reflective sheet extend toward the pattern dot region and are in a shape of a semicircle, to expose the first light-absorbing region.

According to some embodiments of the present invention, there is a third light-absorbing region on at least one of the top surface and the bottom surface of the light guide plate, and the third light-absorbing region is adjacent to the plurality of light exit surfaces.

Therefore, according to some embodiments, in the illuminated touch panel and the backlight assembly thereof, the plurality of light blocking bars and the plurality of extending dot regions that are substantially parallel to block a light ray emitted by the light-emitting component in any one of the bar portions from entering an adjacent bar portion, to prevent the pattern dot region of the adjacent bar portion from being erroneously illuminated by the light ray and producing a residual image. In other words, when any one of the light-emitting components is lit up regionally/individually, a bar portion in which a light-emitting component is not lit up may avoid being illuminated simultaneously, thereby alleviating problems of adjacent light interference and residual image, so that each of the bar portions displays a predetermined pattern independently, to help a user view/perform a touch operation.

The following details are illustrated by using specific embodiments with reference to the accompanying drawings, so that it is easier to understand the purpose, the technical content, the features, and the effects achieved therein.

DETAILED DESCRIPTION

The embodiments of the present invention will be described in detail below by way of example and with reference to the accompanying drawings. In the descriptions of this specification, many specific details are provided for a reader to have a thorough understanding of the present invention. However, the present invention may still be implemented without some or all of the specific details. The same or similar elements in the drawings will be denoted by the same or similar symbols. It should be noted that the accompanying drawings are only schematic, and do not represent the actual size or the quantity of elements. Some details may not be completely drawn, to keep the accompanying drawings concise.

Figure 1:
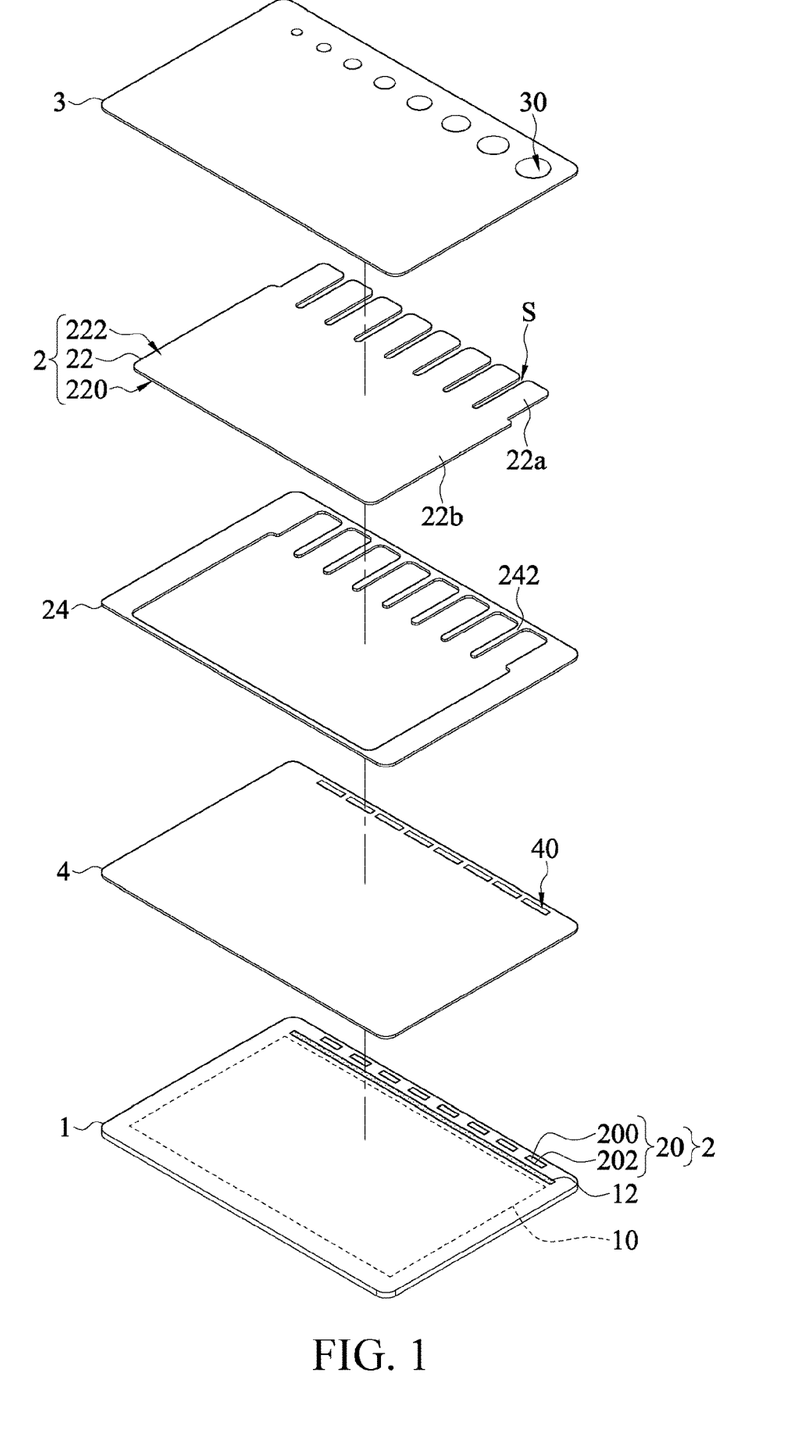
FIG. 1 is a schematic three-dimensional exploded view of a illuminated touch panel according to some embodiments.
Figure 2:
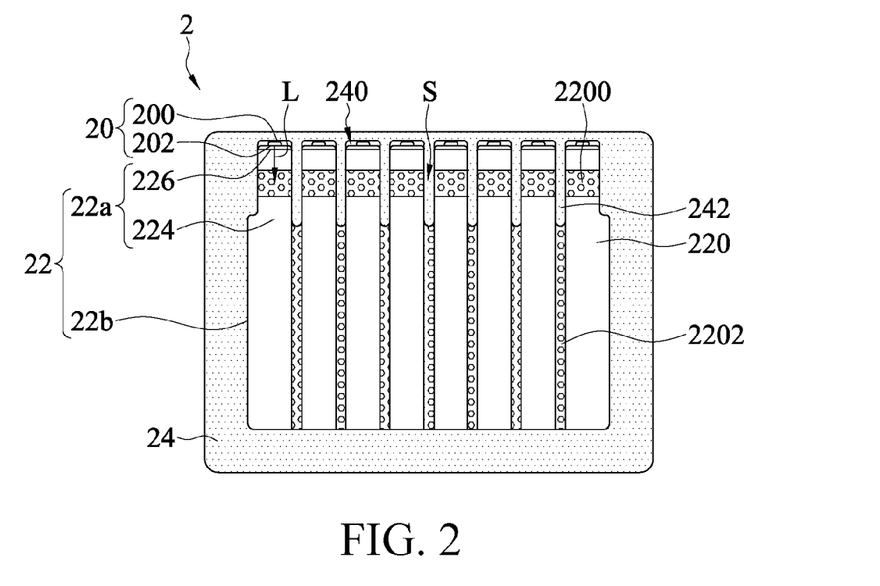
FIG. 2 is a schematic top view of a backlight assembly according to some embodiments.

FIG. 1 is a schematic three-dimensional exploded view of a illuminated touch panel according to some embodiments. FIG. 2 is a schematic top view of a backlight assembly according to some embodiments.

Referring to both FIG. 1 and FIG. 2, according to some embodiments of the present invention, an illuminated touch panel includes a circuit board 1, a backlight assembly 2, and a cover plate 3.

In some embodiments, the illuminated touch panel is a multifunctional touch panel integrating a touch panel and a backlight assembly, and has at least three operation modes: (1) In a general mode, when a multilayer illuminated touch panel does not emit light, the multilayer illuminated touch panel is black and is not different from a common touch panel, and may be provided for manipulating a mouse cursor, clicking to select and control, and the like. (2) In a full-region lighting mode, the illuminated touch panel can display all virtual keys and visual images, for example, but not limited to: displaying operational characters, such as a virtual numeric keyboard, in a specific region and displaying status images, such as a rotational speed of a fan, a volume of a speaker, and screen brightness, of a computer in other regions. An application of the foregoing notebook computer is used as an example. A controller of the notebook computer performs, according to a touch signal returned by the illuminated touch panel, processing as if a corresponding status image/operational character is pressed. (3) In a regional lighting mode, the illuminated touch panel may selectively display some of the visual images. An application of the foregoing notebook computer is used as an example. A controller of the notebook computer performs, according to a touch signal returned by the illuminated touch panel, processing as if a corresponding status image/operational character is pressed, to adjust values, such as a rotational speed of a fan, a volume of a speaker, and screen brightness, of the notebook computer. In some embodiments, the illuminated touch panel is configured to display the foregoing status images for the user to visually determine a current working status of hardware/software, but has no corresponding touch function.

The circuit board 1 includes a touch circuit 10. In some embodiments, the circuit board 1 is a flexible printed circuit board. For example, the circuit board is a glass-fiber (FR4/FR5/FRP) printed circuit board.

The backlight assembly 2 includes a light source module 20, a light guide plate 22, and an outer stop 24. The light source module 20 includes a plurality of light-emitting components 200 located on the circuit board 1. Each of the light-emitting components 200 has a light exit surface 202. In some embodiments, the light-emitting component 200 may be, but is not limited to, a light-emitting diode element.

The light guide plate 22 is located on the circuit board 1. The light guide plate 22 includes a bottom surface 220 and a top surface 222 that are opposite to each other, and a plurality of pattern dot regions 2200. The pattern dot region 2200 corresponds to the top surface 222, and the pattern dot region 2200 is configured to change a propagation direction of a light ray L entering the pattern dot region 2200, so that the light ray L is directed toward the top surface 222. In some embodiments, the pattern dot region 2200 is located on the bottom surface 220 of the light guide plate 22 and is disposed opposite to the top surface 222. In some embodiments, the pattern dot region 2200 includes a plurality of dots (or referred to as screen dots or light dots), which may be convex dots or concave dots, but not limited thereto, and may be in any shape such as an irregular shape, a cone, a square, a triangle, or a trapezoid. In some examples, the dot may be a concave dot recessed in the light guide plate 22 without protruding from the bottom surface 220, or may be a convex dot protruding from the bottom surface 220 toward the outside of the light guide plate 22. A shape and a size of each of the dots, a spacing between adjacent convex dots, and/or a spacing between adjacent concave dots may be adjusted according to a pattern of light emitted by the light-emitting component 200, a shape of a window region 30 in a top view, a material and surface roughness of the light guide plate 22, and the like. A better design solution may be obtained through experiments for the foregoing adjustment. In addition, in some embodiment, the pattern dot region 2200 may be implemented through screen dots or screen lines formed by printing ink on the bottom surface 220 of the light guide plate 22. Therefore, the light guide plate 22 receives the light ray L emitted by the light-emitting component 200, so that the light ray L enters the interior of the light guide plate 22 for total internal reflection, and is scattered when encountering the pattern dot region 2200 to produce a predetermined light emitting effect.

Further, the light guide plate 22 includes a plurality of bar portions 22a and a connecting portion 22b. The plurality of bar portions 22a are in communication with a same side of the connecting portion 22b side by side, and the plurality of bar portions 22a are separated from each other. There is a narrow slot S between any two adjacent bar portions 22a. Each of the bar portions 22a includes a connecting end 224 and a light entrance end 226 that are opposite to each other, and the pattern dot region 2200. The pattern dot region 2200 is located on the bottom surface 220 of the light guide plate 22. Because the connecting portion 22b is connected to the plurality of connecting ends 224, each of the bar portions 22a is in communication with the connecting portion 22b through the connecting end 224 thereof. Additionally, the connecting portion 22b includes a plurality of extending dot regions 2202. The long axis direction of each of the extending dot regions 2202 is substantially parallel to the length direction of each of the narrow slots S.

The outer stop 24 is located at an outer periphery of the light guide plate 22, and is located between the cover plate 3 and the circuit board 1. There are a plurality of gaps 240 between the outer stop 24 and the plurality of light entrance ends 226 of the plurality of bar portions 22a, the plurality of light-emitting components 200 are located in the plurality of gaps 240, and the plurality of light exit surfaces 202 face the plurality of light entrance ends 226. Each of the light-emitting components 200 emits a light ray L toward each of the light entrance ends 226 through the light exit surface 202, so that the light ray L enters the interior of the light guide plate 22 for total internal reflection, and is scattered toward the top surface 222 when encountering the pattern dot region 2200 to produce a predetermined light emitting effect. For example, the outer stop 24 is a ring structure and surrounds the light guide plate 22. Accordingly, the outer stop 24 can prevent the light ray L emitted by the light source module 20 from leaking out, thereby avoiding a light leakage phenomenon.

The outer stop 24 includes a plurality of light blocking bars 242. The plurality of light blocking bars 242 are arranged side by side and fitted with the plurality of narrow slots S, and the long axis direction of each of the extending dot regions 2202 is substantially parallel to the length direction of each of the narrow slots S. Accordingly, the length direction of the plurality of light blocking bars 242 is substantially parallel to the long axis direction of each of the extending dot regions 2202. Therefore, the plurality of light blocking bars 242 extending inward from the outer stop 24 may block a light ray L emitted by a light-emitting component 200 in any one of the bar portions 22a from entering an adjacent bar portion 22a, to prevent the light ray L from entering the pattern dot region 2200 of the adjacent bar portion 22a, and prevent the light ray L from being emitted from the top surface 222 of the adjacent bar portion 22a under the effect of the pattern dot region 2200 and producing an unexpected light emitting effect. In addition, the plurality of extending dot regions 2202 scatter the light ray L to destroy the total internal reflection inside the connecting portion 22b, to prevent the light ray L from any one of the bar portions 22a from reaching the adjacent bar portion 22a through the total internal reflection, or to help reduce a light intensity value of the light ray L when the light ray L reaches the adjacent bar portion 22a. Accordingly, the plurality of extending dot regions 2202 are used as a light attenuation structure, to prevent the light ray L from entering the pattern dot region 2200 of the adjacent bar portion 22a, and prevent the light ray L from being emitted from the top surface 222 of the adjacent bar portion 22a under the effect of the pattern dot region 2200 and producing an unexpected light emitting effect. In some embodiments, the plurality of light blocking bars 242 are a grill-like structure and arranged side by side on a same side of the outer stop 24 to extend toward the narrow slot S. In some embodiments, a material of the outer stop 24 may be opaque or light-absorbing plastic, for example, but not limited to, polycarbonate (PC).

The cover plate 3 is located on the top surface 222 of the light guide plate 22 opposite to the bottom surface 220. The cover plate 3 includes a plurality of window regions 30 corresponding to the plurality of pattern dot regions 2200. Therefore, the light ray L scattered by the pattern dot region 2200 penetrates through the plurality of window regions 30 to display a predetermined pattern for a user to view/perform a touch operation from the above of the cover plate 3. In some embodiments, a surface of the cover plate 3 is smoothed or/and hardened, to help a user touch and/or improve wear resistance. In some embodiments, a material of the cover plate 3 may be, but is not limited to, an opaque or semi-transparent material, for example, but not limited to, glass or a film such as a polyester film (Mylar).

According to the above structure, the illuminated touch panel has the plurality of light blocking bars 242 and the plurality of extending dot regions 2202 that are substantially parallel to block the light ray L emitted by the light-emitting component 200 in any one of the bar portions 22a from entering the adjacent bar portion 22a, to prevent the light ray L from entering the pattern dot region 2200 of the adjacent bar portion 22a, and prevent the light ray L from being emitted from the top surface 222 of the adjacent bar portion 22a under the effect of the pattern dot region 2200, producing an unexpected light emitting effect, and further displaying a residual image through the window regions 30 in the cover plate 3. In other words, when any one of the light-emitting components 200 is lit up regionally/individually, the bar portion 22a corresponding to the light-emitting component 200 that is not lit up may be prevented from being erroneously illuminated by the light ray L and causing simultaneous imaging through the corresponding window region 30, thereby alleviating problems of adjacent light interference and residual image, so that each of the window regions 30 in the cover plate 3 displays the predetermined pattern independently, to help a user to view/perform a touch operation from the above of the cover plate 3.

Figure 3:
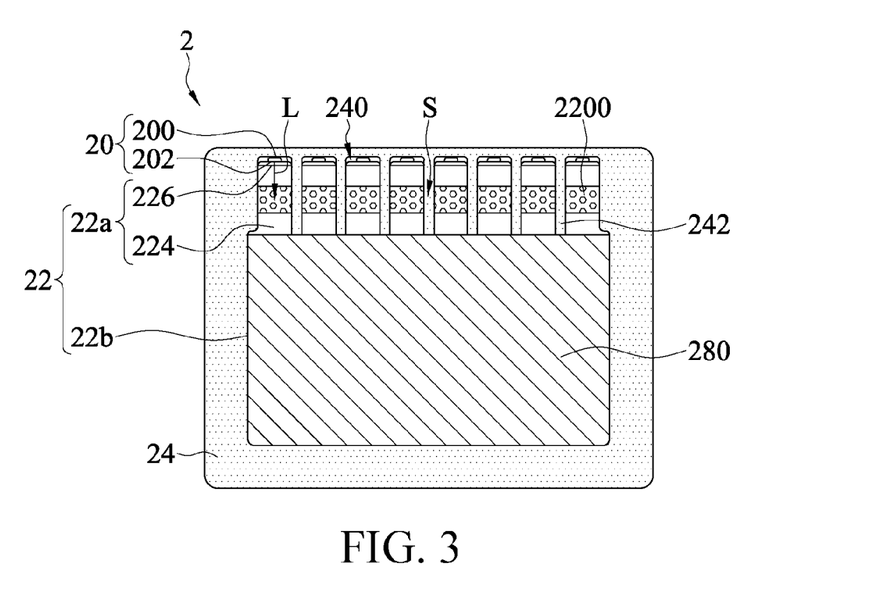
FIG. 3 is a schematic top view of a backlight assembly according to some embodiments.

Referring to FIG. 3, in some embodiments, the backlight assembly 2 further includes a light-absorbing layer 280. The light-absorbing layer 280 is located on at least one of the top surface 222 and the bottom surface 220 of the light guide plate 22. An orthographic projection of the light-absorbing layer 280 on the light guide plate 22 overlaps the plurality of extending dot regions 2202. Therefore, the light-absorbing layer 280 absorbs a light ray L from any one of the bar portions 22a or reduces a light intensity value of the light ray L, to prevent the light ray L from continuing to propagate toward the connecting portion 22b and reaching the adjacent bar portion 22a through total internal reflection. In other words, the light-absorbing layer 280 is used as a light attenuation structure between the adjacent bar portions 22a to alleviate problems of adjacent light interference and residual image. In some embodiments, the light-absorbing layer 280 is formed by printing black paint on at least one of the top surface 222 and the bottom surface 220 of the light guide plate 22.

Figure 4:
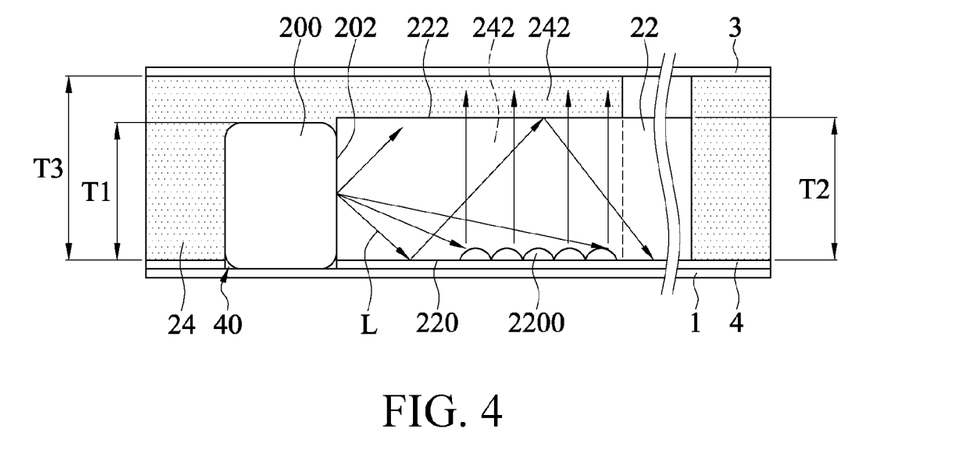
FIG. 4 is a schematic side view of a illuminated touch panel according to some embodiments.

Referring to FIG. 4, in some embodiments, the light-emitting component 200 has a thickness T1, the light guide plate 22 has a thickness T2, the outer stop 24 has a thickness T3, and the thickness T3 of the outer stop 24 is greater than the thickness T2 of the light guide plate 22 and the thickness T1 of each of the light-emitting components 200. The light-emitting component 200 emits the light ray L through the light exit surface 202, and the light ray L is propagated between the top surface 222 and the bottom surface 220 of the light guide plate 22 through total internal reflection. Even if the light ray L escapes from the light-emitting component 200 and the light guide plate 22 along a horizontal direction, the light ray L is still blocked by the outer stop 24. Therefore, the outer stop 24 can prevent the light ray L emitted by each of the light-emitting components 200 from leaking out along the horizontal direction and entering the adjacent bar portion 22a, thereby avoiding a light leakage phenomenon and alleviating problems of adjacent light interference and residual image.

Still referring to both FIG. 1 and FIG. 2, in some embodiments, the area of the plurality of pattern dot regions 2200 is larger than the area of the plurality of window regions 30. Therefore, light intensity of the light ray L emitted by the light-emitting component 200 is attenuated by a scattering effect of the plurality of pattern dot regions 2200, to prevent the light ray L from continuing to propagate toward the connecting portion 22b to reach the adjacent bar portion 22a through total internal reflection, to alleviate problems of adjacent light interference and residual image.

Figure 5:
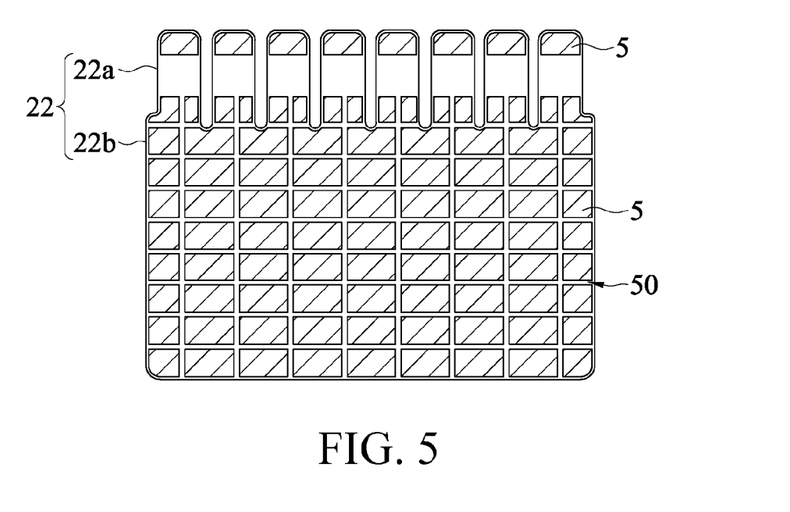
FIG. 5 is a schematic top view of an adhesive layer according to some embodiments.
Figure 6A:
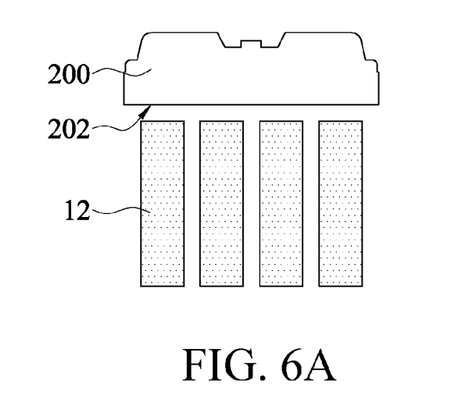
FIG. 6A to FIG. 6F are schematic partially enlarged top views of a circuit board according to some embodiments.
Figure 6B:
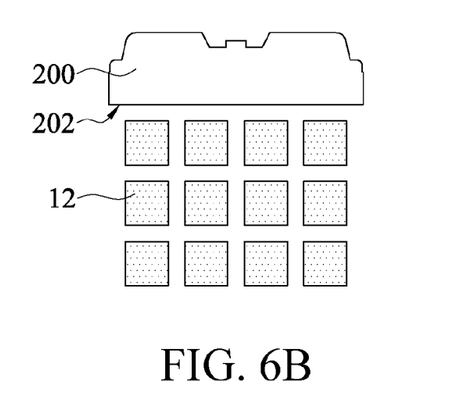
Figure 6C:
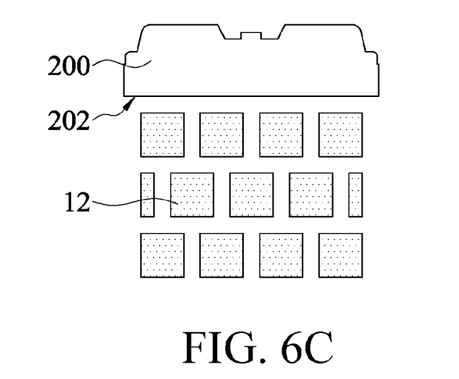
Figure 6D:
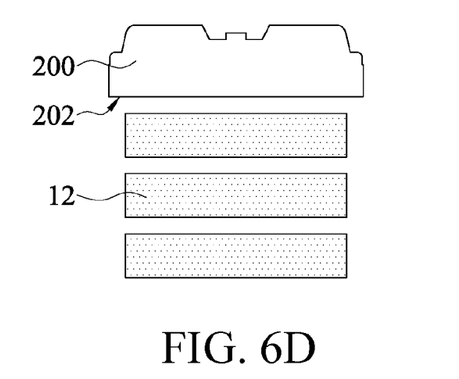
Figure 6E:
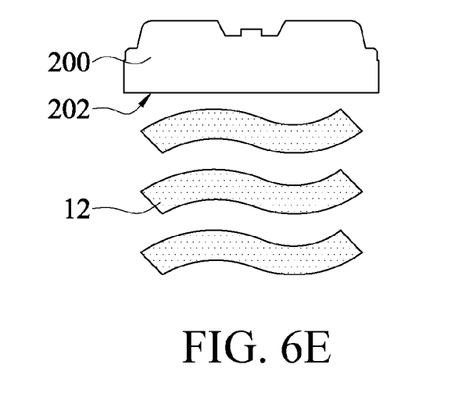
Figure 6F:
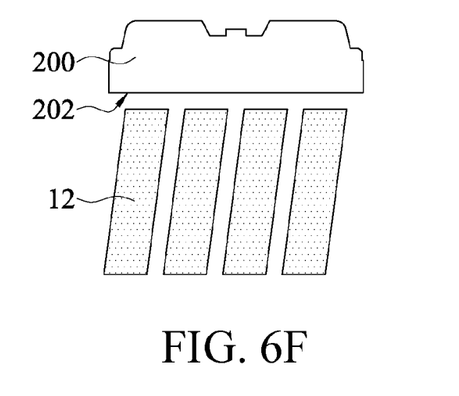

Referring to FIG. 5, in some embodiments, according to some embodiments of the present invention, an adhesive layer 5 is located on at least one of the top surface 222 and the bottom surface 220 of the light guide plate 22, and an orthographic projection of the adhesive layer 5 on the light guide plate 22 overlaps the connecting portion 22b. Because the light ray L produces an optical phenomenon similar to that of ground glass when the light ray L penetrates the adhesive layer 5, the adhesive layer 5 may be used as a light attenuation structure. Therefore, the adhesive layer 5 absorbs the light ray L from any one of the bar portions 22a or reduces the light intensity value of the light ray L, to prevent the light ray L from reaching the adjacent bar portion 22a through total internal reflection. In other words, the adhesive layer 5 is used as a light attenuation structure between the adjacent bar portions 22a to alleviate problems of adjacent light interference and residual image. In some embodiments, the adhesive layer 5 may be, but is not limited to, a hydrogel layer with opaque material or light-absorbing material.

In some embodiments, the adhesive layer 5 includes a plurality of channels 50, and the channels 50 are in communication with an external environment. Therefore, bubbles/air contained in the adhesive layer 5 may reach balance or be in approximation with the external air pressure through an exhaust structure such as the channel 50, improving product reliability.

Still referring to FIG. 1, in some embodiments, there is a first light-absorbing region 12, corresponding to the plurality of light-emitting components 200, on the circuit board 1, which is, for example, but not limited to, the first light-absorbing region 12 in a long strip shape. However, the first light-absorbing region 12 may include a plurality of inconsecutive sub-regions to avoid absorbing too many light rays L. For example, referring to both FIG. 6A to FIG. 6F, in some embodiments, there is a first light-absorbing region 12, corresponding to the plurality of light-emitting components 200, on the circuit board 1. The first light-absorbing region 12 is adjacent to the plurality of light exit surfaces 202. That is, the first light-absorbing region 12 is located on the circuit board 1 in front of the plurality of light-emitting components 200. Therefore, the first light-absorbing region 12 absorbs the light ray L from the light exit surface 202, and reduces a light intensity difference between a front and both sides of the light exit surface 202 when the light-emitting component 200 emits light, to prevent hot spot phenomenon. Therefore, brightness distribution of the bar portion 22a of the light guide plate 22 is much more uniform visually, to prevent hot spot phenomenon resulting from distance between the light-emitting component 200 and the pattern dot region 2200 being too close. In some embodiments, the first light-absorbing region 12 is formed by printing black paint on the circuit board 1. In some embodiments, design of a light-absorbing pattern, a geometric shape, an area, and the like of the first light-absorbing region 12 may be adjusted according to factors such as a light-emitting angle (a view angle) and emitted light intensity of the light-emitting component 200, and a width of the bar portions 22a. A better design solution may be obtained through experiments for the foregoing adjustment, for example, but not limited to, the content shown in FIG. 6A to FIG. 6F.

Figure 7:
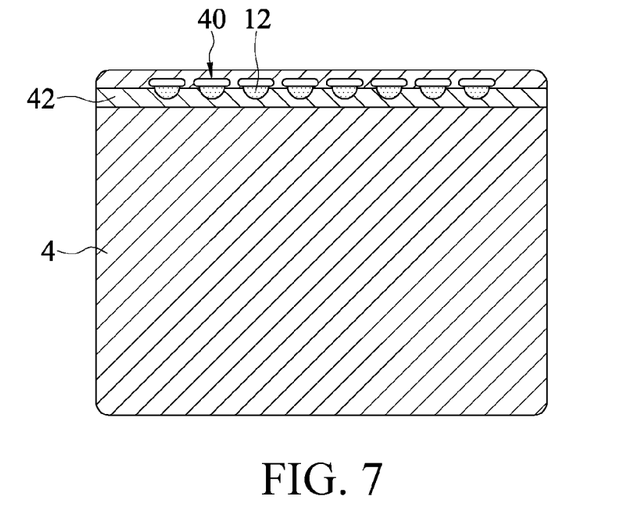
FIG. 7 is a schematic top view of a reflective sheet according to some embodiments.

Referring to FIG. 1 and FIG. 7, a reflective sheet 4 is located between the circuit board 1 and the light guide plate 22. The reflective sheet 4 includes a plurality of avoidance openings 40, orthographic projections of the plurality of avoidance openings 40 on the light guide plate 22 overlap the plurality of gaps 240, and the plurality of light-emitting components 200 are located in the plurality of avoidance openings 40 and protrude from the reflective sheet 4. Therefore, each of the light-emitting components 200 emits the light ray L through the light exit surface 202, and the light ray L enters the bar portion 22a of the light guide plate 22 from the light entrance end 226. The reflective sheet 4 reflects the light ray L emitted by the light-emitting component 200 and the light ray L leaking from the bottom surface 220 of the light guide plate 22, to increase a quantity of light rays entering the light guide plate 22 for total internal reflection and transmission. In some embodiments, the reflective sheet 4 is manufactured on the circuit board 1 through film printing. In some embodiments, the reflective sheet 4 is manufactured on the bottom surface 220 of the light guide plate 22 in an adhering manner.

In some embodiments, there is a second light-absorbing region 42 on the reflective sheet 4, and the second light-absorbing region 42 is adjacent to the plurality of light exit surfaces 202. Therefore, the second light-absorbing region 42 absorbs the light ray L from the light exit surface 202, and reduces a light intensity difference between a front and both sides of the light exit surface 202 when the light-emitting component 200 emits light, to prevent hot spot phenomenon. Therefore, brightness distribution of the bar portion 22a of the light guide plate 22 is much more uniform visually, to prevent hot spot phenomenon resulting from distance between the light-emitting component 200 and the pattern dot region 2200 being too close. In some embodiments, the second light-absorbing region 42 is formed by printing black paint on the reflective sheet 4. In some embodiments, design of a light-absorbing pattern, a geometric shape, an area, and the like of the second light-absorbing region 42 may be adjusted according to factors such as a light-emitting angle (a view angle) and emitted light intensity of the light-emitting component 200, and a width of the bar portions 22a. A better design solution may be obtained through experiments for the foregoing adjustment.

In some embodiments, the plurality of avoidance openings 40 of the reflective sheet 4 extend toward the pattern dot region 2200 (from the view of FIG. 7) and are in a shape of a semicircle, as shown in FIG. 7, and the avoidance opening 40 exposes the first light-absorbing region 12. In other words, the first light-absorbing region 12 is visible from the view angle of FIG. 7. There is a first light-absorbing region 12 on the circuit board 1, there is a second light-absorbing region 42 on the reflective sheet 4, and the first light-absorbing region 12 and the second light-absorbing region 42 are adjacent to the plurality of light exit surfaces 202. Therefore, each of the light-emitting components 200 emits the light ray L through the light exit surface 202, and the light ray L enters the bar portion 22a of the light guide plate 22 from the light entrance end 226. The reflective sheet 4 reflects the light ray L emitted by the light-emitting component 200 and the light ray L leaking from the bottom surface 220 of the light guide plate 22, to increase a quantity of light rays entering the light guide plate 22 for total internal reflection and transmission, and prevent the light ray L from excessive loss. In this case, the first light-absorbing region 12 and the second light-absorbing region 42 absorb the light ray L from the light exit surface 202, and reduce the light intensity difference between the front and both sides of the light exit surface 202 when the light-emitting component 200 emits light, to prevent hot spot phenomenon. Accordingly, the brightness distribution of the bar portion 22a of the light guide plate 22 is much more uniform visually, to prevent hot spot phenomenon resulting from distance between the light-emitting component 200 and the pattern dot region 2200 being too close.

Figure 8:
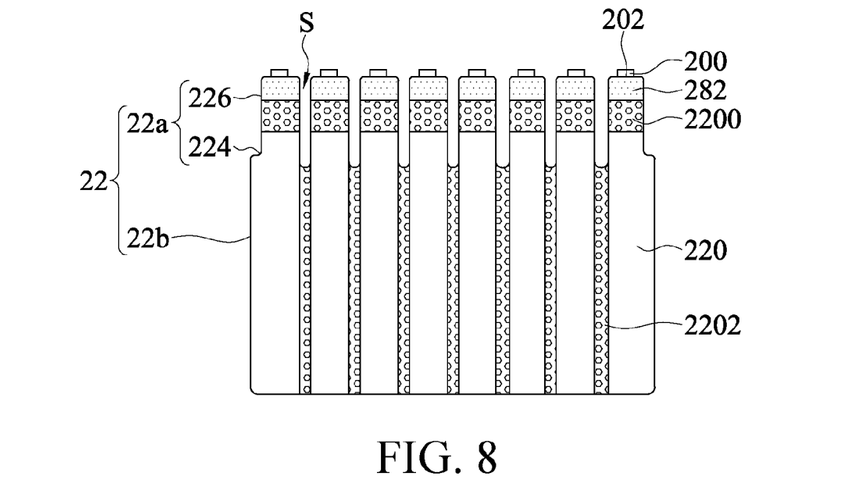
FIG. 8 is a schematic top view of a light guide plate according to some embodiments.
Figure 9A:
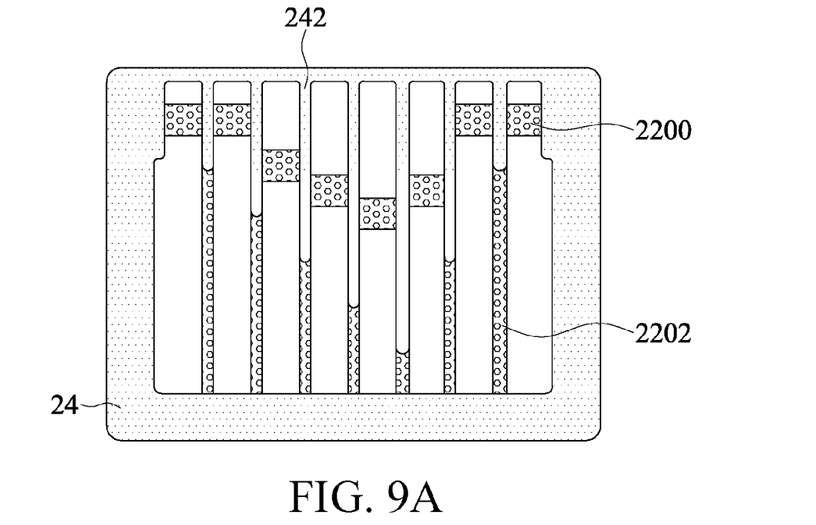
FIG. 9A to FIG. 9H are schematic top views of a backlight assembly according to some embodiments.
Figure 9B:
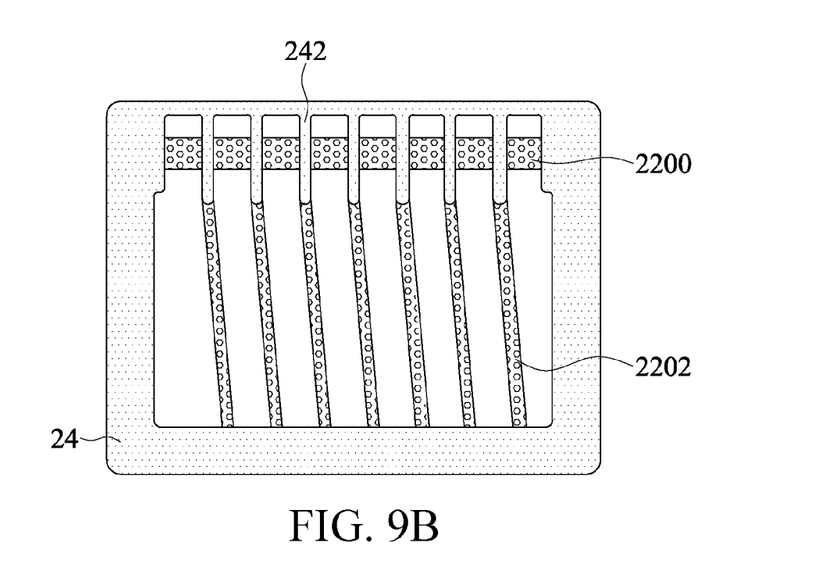
Figure 9C:
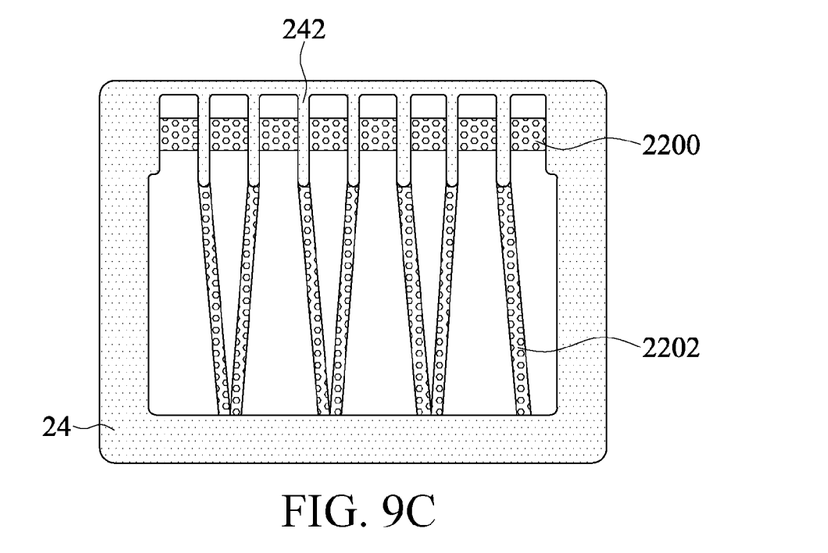
Figure 9D:
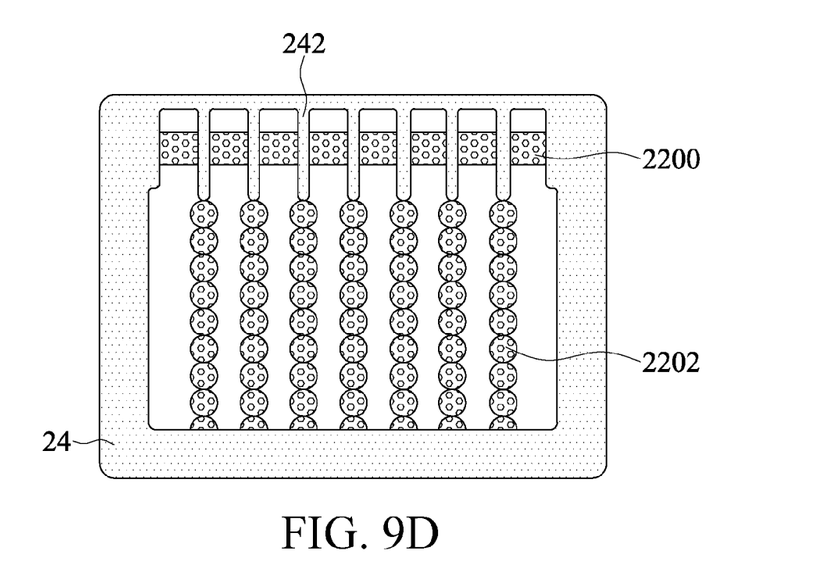
Figure 9E:
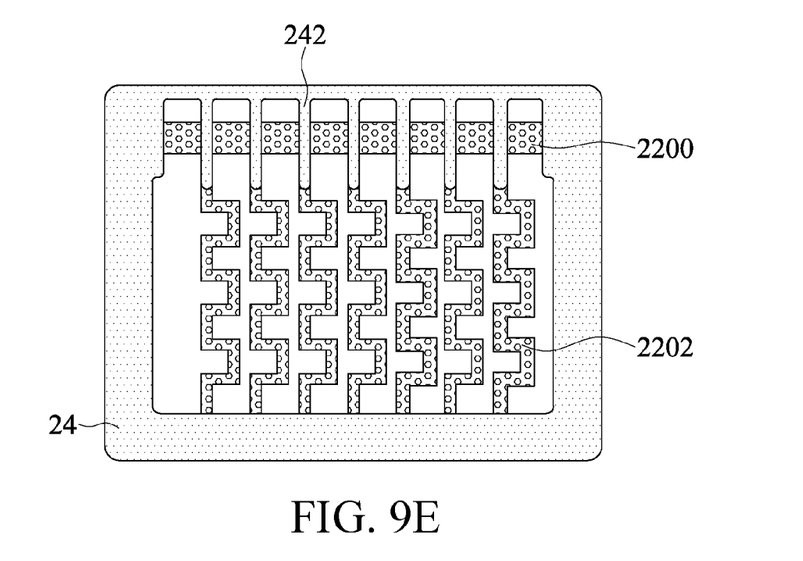
Figure 9F:
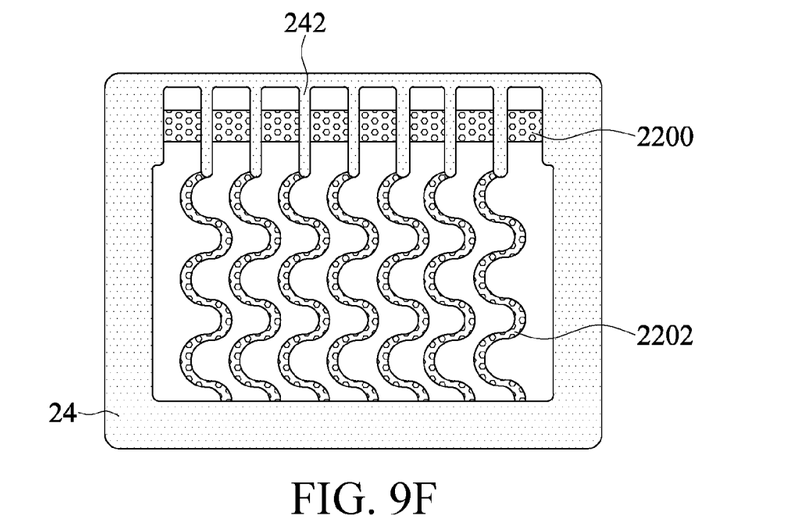
Figure 9G:
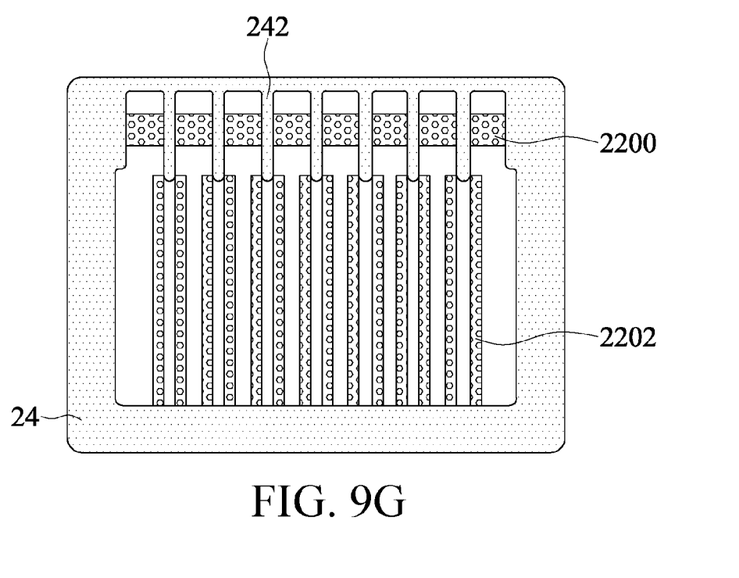
Figure 9H:
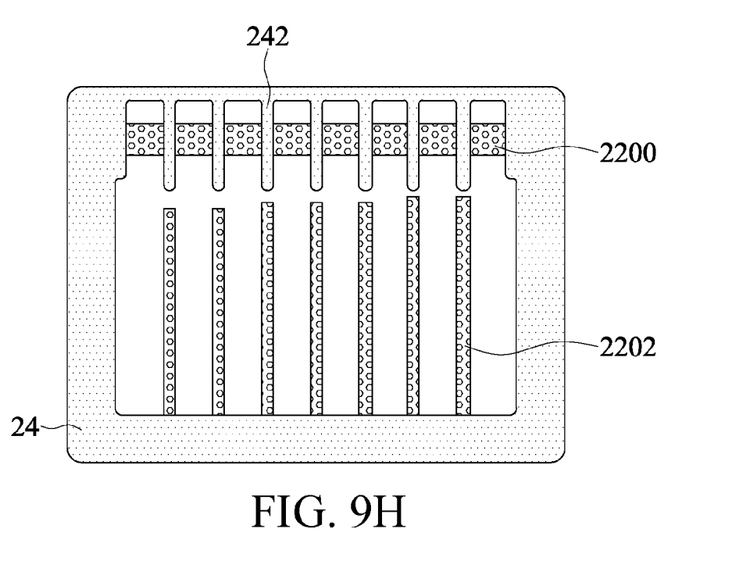

Referring to FIG. 8, in some embodiments, there is a third light-absorbing region 282 on the light guide plate 22. The third light-absorbing region 282 is located on at least one of the top surface 222 and the bottom surface 220, and the third light-absorbing region 282 is adjacent to the plurality of light exit surfaces 202. Therefore, the third light-absorbing region 282 absorbs the light ray L from the light exit surface 202, and reduces the light intensity difference between the front and both sides of the light exit surface 202 when the light-emitting component 200 emits light, to prevent hot spot phenomenon. Accordingly, the brightness distribution of the bar portion 22a of the light guide plate 22 is much more uniform visually, to prevent hot spot phenomenon resulting from distance between the light-emitting component 200 and the pattern dot region 2200 being too close.

Referring to FIG. 9A to FIG. 9H, in some embodiments, when the light guide plate 22 is viewed from the above, the long axis directions of the plurality of light blocking bars 242 and the plurality of extending dot regions 2202 are substantially parallel to each other. The extending dot region 2202 is allowed to have more changes in terms of a bending angle, a geometric shape, and the like. Therefore, the term "substantially parallel" mentioned in this specification still includes the derivative embodiments, and is not limited to the coaxially parallel form shown in FIG. 2. Therefore, the light ray L emitted by the light-emitting component 200 in any one of the bar portions 22a is blocked from entering the adjacent bar portion 22a, and is prevented from entering the pattern dot region 2200 of the adjacent bar portion 22a and from being emitted from the top surface 222 of the adjacent bar portion 22a under the effect of the pattern dot region 2200 and producing an unexpected light emitting effect.

Based on the above, according to some embodiments, in the backlight assembly 2 and the illuminated touch panel thereof, the plurality of light blocking bars 242 and the plurality of extending dot regions 2202 that are substantially parallel are used to block the light ray L emitted by the light-emitting component 200 in any one of the bar portions 22a from entering the adjacent bar portion 22a, to prevent the pattern dot region 2200 of the adjacent bar portion 22a from being erroneously illuminated by the light ray L and producing a residual image. In other words, when any one of the light-emitting components 200 is lit up regionally/individually, the bar portion 22a corresponding to the light-emitting component 200 that is not lit up may avoid being illuminated simultaneously, thereby alleviating problems of adjacent light interference and residual image, so that each of the bar portions 22a displays a predetermined pattern independently, to help a user view/perform a touch operation from the above of the cover plate 3. In addition, in some embodiments, there is a first light-absorbing region 12 on the circuit board 1, there is a second light-absorbing region 42 on the reflective sheet 4, and there is a third light-absorbing region 282 on the light guide plate 22. Therefore, the first light-absorbing region 12, the second light-absorbing region 42, and the third light-absorbing region 282 absorb the light ray L from the light exit surface 202, and reduce a light intensity difference between the front and both sides of the light exit surface 202 when the light-emitting component 200 emits light, thereby preventing brightness distribution of the bar portion 22a from being non-uniform visually, and alleviating hot spot phenomena.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An illuminated touch panel, comprising:
   a circuit board, comprising a touch circuit;
   a backlight assembly, comprising:
   a light source module, comprising a plurality of light-emitting components on the circuit board, wherein each of the light-emitting components has a light exit surface;
   a light guide plate, located on the circuit board and comprising a plurality of bar portions and a connecting portion, wherein the bar portions are separated from each other and arranged side by side, each of the bar portions comprises a pattern dot region located on a bottom surface of the light guide plate, a connecting end and a light entrance end that is opposite to the connecting end, the connecting portion is connected to the connecting ends, and the connecting portion comprises a plurality of extending dot regions, wherein there is a narrow slot between any two adjacent bar portions, and a long axis direction of each of the extending dot regions is substantially parallel to the length direction of each of the narrow slots; and
   an outer stop, located at an outer periphery of the light guide plate, wherein there are a plurality of gaps between the outer stop and the light entrance ends, the outer stop comprises a plurality of light blocking bars, and the light blocking bars are arranged side by side and fitted with the narrow slots, wherein the light-emitting components are located in the gaps, and the light exit surfaces face the light entrance ends; and
   a cover plate, located on a top surface of the light guide plate opposite to the bottom surface, wherein the cover plate comprises a plurality of window regions corresponding to the pattern dot regions.

2. The illuminated touch panel according to claim 1, further comprising a light-absorbing layer, located on at least one of the top surface and the bottom surface of the light guide plate, wherein an orthographic projection of the light-absorbing layer on the light guide plate overlaps the extending dot regions.

3. The illuminated touch panel according to claim 1, wherein the thickness of the outer stop is greater than the thickness of the light guide plate and the thickness of each of the light-emitting components.

4. The illuminated touch panel according to claim 1, wherein the area of the pattern dot regions is larger than the area of the window regions.

5. The illuminated touch panel according to claim 1, further comprising an adhesive layer, located on at least one of the top surface and the bottom surface of the light guide plate, wherein an orthographic projection of the adhesive layer on the light guide plate overlaps the extending dot regions.

6. The illuminated touch panel according to claim 1, wherein the circuit board has a first light-absorbing region thereon, and the first light-absorbing region is adjacent to the light exit surfaces.

7. The illuminated touch panel according to claim 1, further comprising:
   a reflective sheet, located between the circuit board and the light guide plate and comprising a plurality of avoidance openings, wherein orthographic projections of the avoidance openings on the light guide plate overlap the gaps, and the light-emitting components are located in the avoidance openings and protrude from the reflective sheet, wherein the reflective sheet has a second light-absorbing region thereon, and the second light-absorbing region is adjacent to the light exit surfaces.

8. The illuminated touch panel according to claim 7, wherein the circuit board has a first light-absorbing region thereon, the first light-absorbing region is adjacent to the light exit surfaces, and the avoidance openings of the reflective sheet extend toward the pattern dot regions and are in a shape of a semicircle, to expose the first light-absorbing region.

9. The illuminated touch panel according to claim 1, wherein at least one of the top surface and the bottom surface of the light guide plate has a third light-absorbing region thereon, and the third light-absorbing region is adjacent to the light exit surfaces.

10. A backlight assembly, adapted to be electrically connected to a circuit board, the backlight assembly comprising:
    a light source module, comprising a plurality of light-emitting components located on the circuit board, wherein each of the light-emitting components has a light exit surface;
    a light guide plate, located on the circuit board and comprising a plurality of bar portions and a connecting portion, wherein the bar portions are separated from each other and arranged side by side, each of the bar portions comprises a pattern dot region located on a bottom surface of the light guide plate, a connecting end and a light entrance end that is opposite to the connecting end, the connecting portion is connected to the connecting ends, and the connecting portion comprises a plurality of extending dot regions, wherein there is a narrow slot between any two adjacent bar portions, and the long axis direction of each of the extending dot regions is substantially parallel to the length direction of each of the narrow slots; and
    an outer stop, located at an outer periphery of the light guide plate, wherein there are a plurality of gaps between the outer stop and the light entrance ends, the outer stop comprises a plurality of light blocking bars, and the light blocking bars are arranged side by side and fitted with the narrow slots, wherein the light-emitting components are located in the gaps, and the light exit surfaces face the light entrance ends.

11. The backlight assembly according to claim 10, further comprising a light-absorbing layer, located on at least one of a top surface and the bottom surface of the light guide plate, wherein an orthographic projection of the light-absorbing layer on the light guide plate overlaps the extending dot regions.

12. The backlight assembly according to claim 10, wherein the thickness of the outer stop is greater than the thickness of the light guide plate and the thickness of each of the light-emitting components.

13. The backlight assembly according to claim 10, further comprising an adhesive layer, located on at least one of a top surface and the bottom surface of the light guide plate, wherein an orthographic projection of the adhesive layer on the light guide plate overlaps the extending dot regions.

14. The backlight assembly according to claim 10, wherein the circuit board has a first light-absorbing region thereon, and the first light-absorbing region is adjacent to the light exit surfaces.

15. The backlight assembly according to claim 10, further comprising:
   a reflective sheet, located between the circuit board and the light guide plate and comprising a plurality of avoidance openings, wherein orthographic projections of the avoidance openings on the light guide plate overlap the gaps, and the light-emitting components are located in the avoidance openings and protrude from the reflective sheet, wherein the reflective sheet has a second light-absorbing region thereon, and the second light-absorbing region is adjacent to the light exit surfaces.

16. The backlight assembly according to claim 15, wherein the circuit board has a first light-absorbing region thereon, the first light-absorbing region is adjacent to the light exit surfaces, and the avoidance openings of the reflective sheet extend toward the pattern dot regions and are in a shape of a semicircle, to expose the first light-absorbing region.

17. The backlight assembly according to claim 10, wherein at least one of a top surface and the bottom surface of the light guide plate has a third light-absorbing region thereon, and the third light-absorbing region is adjacent to the light exit surfaces.

\* \* \* \* \*